United States Patent [19]

Kalocsay

[11] 4,275,603

[45] Jun. 30, 1981

[54] INDIRECTLY HEATED AIRCRAFT PROBES AND MASTS

[75] Inventor: Joseph Kalocsay, Renton, Wash.

[73] Assignee: The Boeing Company, Seattle, Wash.

[21] Appl. No.: 96,857

[22] Filed: Nov. 23, 1979

[51] Int. Cl.³ .............................................. G01F 1/46
[52] U.S. Cl. .................................. 73/861.68; 73/182; 165/104.26; 219/201
[58] Field of Search ..................... 73/861.68, 182, 183; 165/105

[56] References Cited

U.S. PATENT DOCUMENTS

| 2,706,408 | 4/1955 | Holbrook | 73/861.68 |
| 2,858,698 | 11/1958 | Hickey | 73/861.68 |
| 2,870,633 | 1/1959 | Harding et al. | 73/861.68 |
| 2,992,313 | 7/1961 | Taylor | 219/209 |
| 3,664,412 | 5/1972 | Zerkle | 165/105 |
| 3,735,175 | 5/1973 | Blomgren | 165/105 |

*Primary Examiner*—Donald O. Woodiel
*Attorney, Agent, or Firm*—Conrad O. Gardner; B. A. Donahue

[57] ABSTRACT

Aircraft probe or mast including heat pipe for indirectly heating the probe or mast thereby providing deicing. Heat for the heat pipe configured probe or mast is supplied by remote location of a heat source. The heat source may include a replacement plug in electric heater or a remote heat source such as an engine air-bleed duct.

3 Claims, 6 Drawing Figures

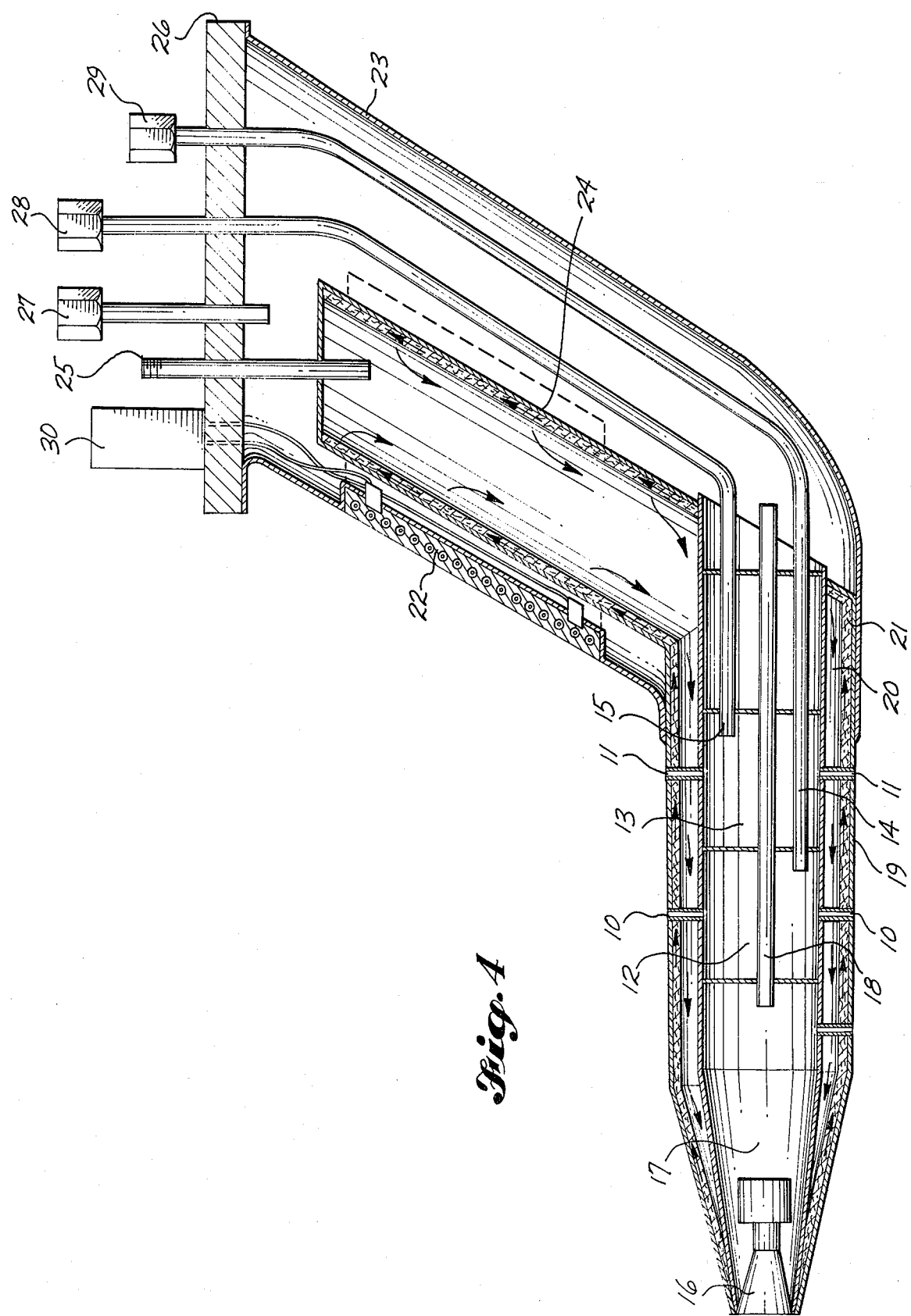

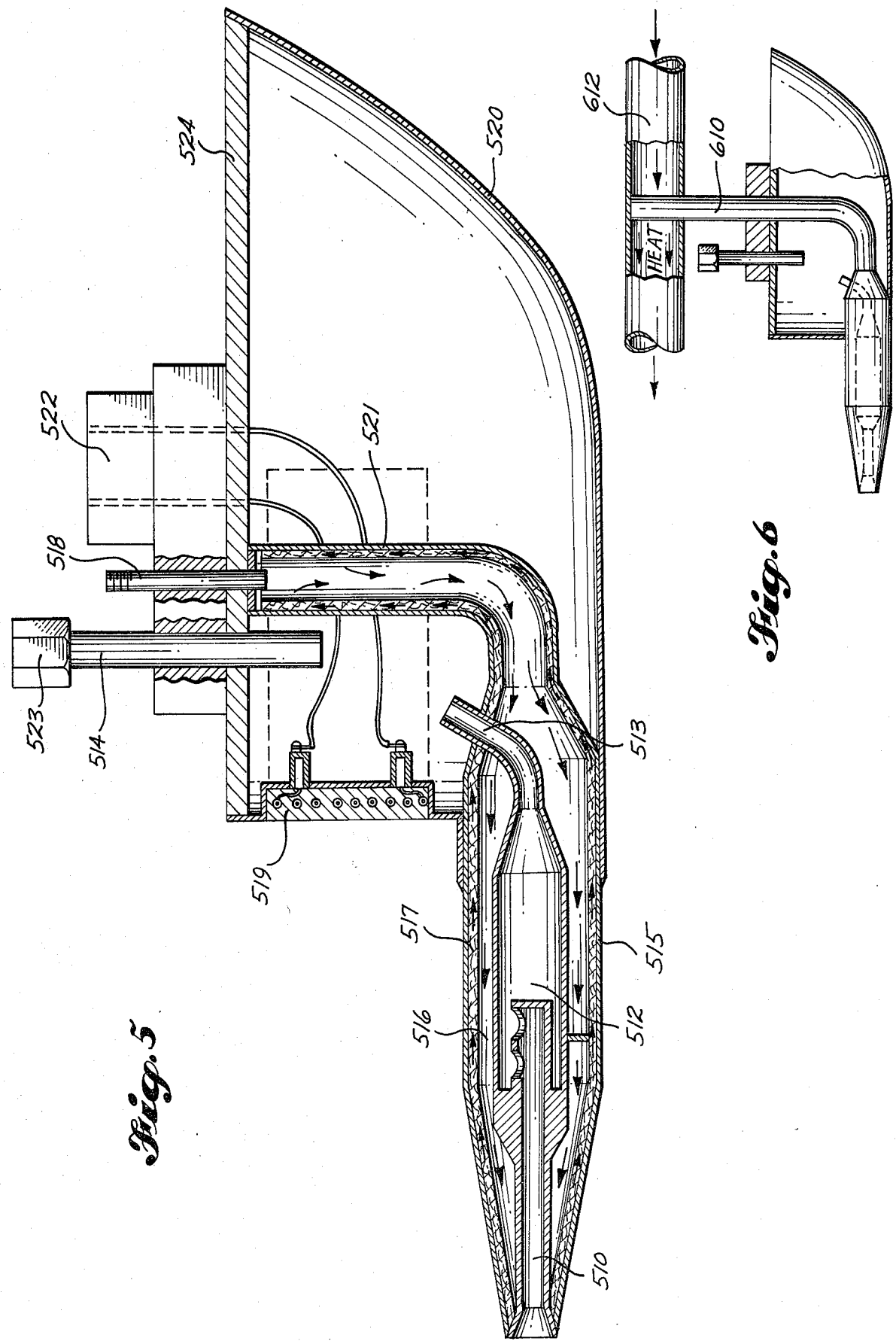

INDIRECTLY HEATED AIRCRAFT PROBES AND MASTS

The present invention relates to heating of aircraft probes or masts, more particularly arrangements including heat pipes associated with aircraft probes or masts in a manner permitting the utilization of a heat source which is remotely located from the probe or mast areas requiring heating.

Heretofore integral electric deicing heaters have been utilized on aircraft probes and masts, however such deicing configurations were susceptible to failures, thereby causing flight delays while the probes or masts were replaced.

Representative of the prior art is U.S. Pat. No. 2,992,313 which shows a hollow antenna which may be mounted to extend through the skin of an aircraft. The hollow in the antenna is partially filled when in an evacuated state with a fluid and then sealed shut. The lower end of the antenna is surrounded by an electric heater. The antenna must be mounted in such a manner that the fluid when in the fluid state will drain to the area surrounded by the heater. This means that the antenna must be mounted substantially above the horizontal in order for the deicing feature to work. The referenced deicing feature functions in the following manner: The heater heats the fluid which evaporates and rises in the antenna, the gaseous fluid gives up heat to the antenna thereby keeping it deiced and then condenses on the internal antenna wall and drains to the heater area. In contrast, embodiments of the present invention differ in that a heat pipe structure is included which contains a wicking material for returning the condensed fluid by capillary action and will work in any position. The requirement of ability to work in any position which is satisfied by embodiments of the present invention is important because drain masts are usually on the bottom of an aircraft and pitot tubes can extend from any convenient portion of the aircraft. One embodiment of the present invention utilizes a replaceable heater feature which importantly reduces the time required to restore the device to an operating condition. The heater disclosed in the aforementioned U.S. Pat. No. 2,992,313 is an integral part of the antenna, therefore requiring replacement of the entire antenna in the event of heater failure.

Also in contrast to embodiments of the present invention, U.S. Pat. No. 2,870,633 is illustrative of a method of heating a pressure probe for an engine air intake which is heated by the use of hot air flowing through passages surrounding the probe.

It is accordingly an object of the present invention to provide means for indirect heating of aircraft associated probes or masts for deicing or other purposes.

It is a further object of the present invention to provide heat sources coupled through heat pipe arrangments adapted for use in coupling the remote heat sources to areas of probes or masts requiring heating. It is yet another object of the present invention to provide remotely located heating means of a replaceable or plug-in nature for coupling through heat pipes to regions of probes or masts for the purposes of deicing thereof.

Further objects and features of the invention will become readily apparent from a reading of the detailed description which follows when taken in conjunction with the accompanying drawings in which:

FIG. 4 is a longitudinal sectional view of the embodiment shown in FIG. 3;

Figure 1:
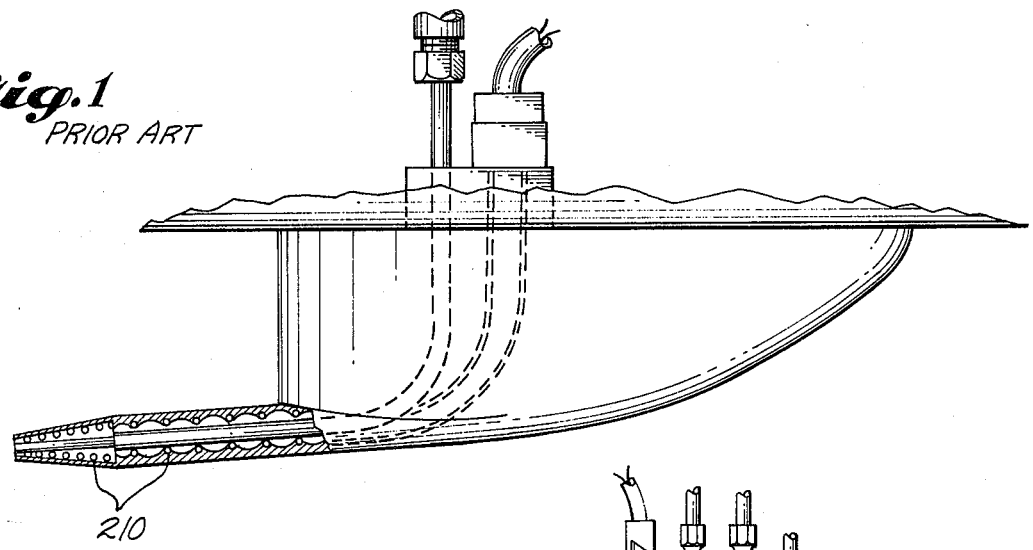
FIG. 1 is a longitudinal (partial) sectional view of a directly heated pitot tube found in the prior art.

FIG. 5 is a longitudinal sectional view of a further embodiment of the invention similar to the structure shown in FIG. 1. However, in contrast thereto showing indirect heating through the utilization of a heat pipe arrangment; and, FIG. 6 is a longitudinal view with parts broken away with a further manner of indirect heating of structures of the present invention utilizing a heat source different from the electric heaters shown in the embodiments of FIGS. 3 through 5.

Figure 2:
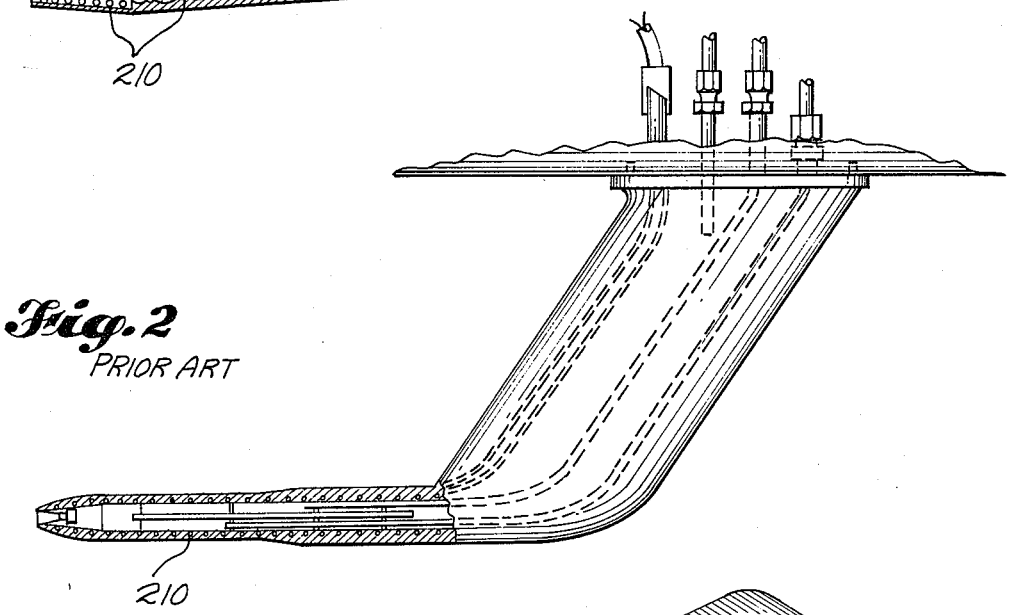
FIG. 2 is a longitudinal (partial) sectional view of a directly heated combined pitot-static probe found in the prior art.

Turning now to the specific means for preventing ice formation and accumulation on pitot tube, combined pitot-static probes, total air temperature probes or for example heated drain masts, it is believed useful to an understanding of the functioning of the present heating means to provide the following brief description of the apparatus shown in the figures. First it should be noted that the pitot probe is arranged so that the inner tube or total pressure tube is open at its forward end in the direction of flight so that air impinging upon it, due to the forward motion of aircraft through air, increases the air pressure within the tube. This can readily be seen from an observation of the prior art structure of FIG. 1. A combined pitot-static probe as shown in FIG. 2 includes static pressure tubes, closed at the forward ends and having one or more orifices in the side opening in a direction normal to the line of flight to atmospheric pressure. The difference in the two pressures in the device of FIG. 2 is a function of the velocity of the aircraft and therefore, by a fundamental relation, if the two pressures are known the velocity of the aircraft can be determined. The total pressure and static pressure tubes typically are connected to a pressure sensitive instrument in the cockpit of the aircraft which translates the difference between the two pressures existing within the tubes into direct velocity reading.

By another fundamental relation the static pressure is a function of the altitude and therefore if the pressure is known, the altitude of the aircraft can be determined. The static pressure tubes are connected to other pressure sensitive instruments in the cockpit (not shown in FIGS. 1 and 2) which translates the static pressure difference into direct altitude reading. The total temperature probe (not illustrated) is arranged to have an opening at its forward and in the direction of the flight so that air impinging upon it, due to the forward motion of the aircraft through the air, increases the air pressure and air temperature within the intake portion of the probe. The temperature rise is detected by the heat sensitive element and transmitted by electrical current to a total air temperature indicator which translates the electric impulses into a direct total air temperature reading. Not shown in FIGS. 1 and 2 are overboard drain masts which are devices mounted on the outside of the aircraft with the drain opening pointed aft into the airstream, for discharging some liquids from the aircraft.

While three embodiments of the invention are hereinafter disclosed, the manner of indirect heating of either pitot or pitot-static probes may be by electric heater mounted directly on the probe mast as illustrated in one of the embodiments or the heating means may be located remotely from the probe mast. Also it should be noted that the particular arrangement of inner chambers and channels in pitot or pitot-static probes-masts may be varied structurally and yet accomplish the same general functions. As a consequence the following specific description of embodiments of the invention should be taken as illustrative of the features and structure required to accomplish the objects according to the invention.

Proceeding now to the embodiment of FIG. 4, it should be noted that in this embodiment there are included static pressure ports 10 and 11 connected to the static pressure chambers 12 and 13, and pressure transmitting tubes 14 and 15. The total pressure (pitot pressure) tube 16 is located at the tip of the probe connected to the total pressure chamber 17 and the pressure transmitting tube 18. The inner pressure chamber system has a conical-cylindrical form which is concentric with the outer shell 19, thereby creating a heating chamber 20 lined on the inner surface with the wick 21. The removable electric heater 22 is located on the probe's mast 23 thereby providing heat to the extended portion of heating chamber 24. The heating chamber is terminated with a sealed filling tube 25. The probe's interface mounting plate 26 is seen supporting pitot and static pressure connecting fittings 27, 28, 29 and the electrical connector 30.

The embodiment of the invention shown in FIG. 5 includes the total pressure (pitot pressure) tube 510 connected to the total pressure chamber 512 and pressure transmitting tubes 513 and 514. The inner pressure chamber 512 concentric with outer shell 515 creates a heating chamber 516 lined on the inner surface by wick 517 and terminated with a sealed filling tube 518. Removable electric heater 519 is located on the probe mast 520 thereby providing heat to the extended portion of the heating chamber 521. Electrical connector 522 and the total pressure tube coupling 523 are located on the probe's interface mounting plate 524.

Turning now to the embodiment of the invention shown in FIG. 6, it will be readily recognized that the essential structure is the same as that shown in the embodiment of FIG. 5 with the exception of heating by an electrical heater 519. In FIG. 6 the heating chamber 610 is extended through the interface mounting plate into a heat transmitting fluid duct 612.

Figure 3:
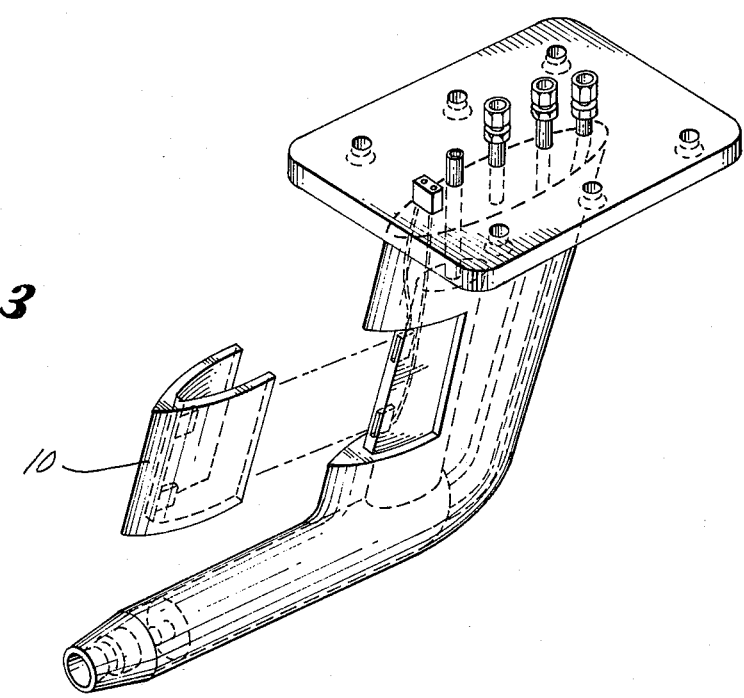
FIG. 3 is an isometric view in accordance with a combined pitot-static probe similar in structure to the prior art device of FIG. 2, but showing the indirectly heated feature in accordance with the present invention.

The embodiment of the invention shown in FIG. 3 is similar to the invention shown in FIG. 4 except that an isometric view is provided to show the removability and location of electric heater 10. The preceding embodiments showing indirect heating in accordance with the present invention may be contrasted to the arrangements shown in FIGS. 1 and 2 which show a heating element 10 integral with the probe and mast structures.

I claim:

1. In a probe structure havng a pitot or combined pitot-static pressure tube and including an inner pressure chamber disposed within an outer shell for providing a heating chamber, means for providing indirect heating of said heating chamber comprising heating means outside said heating chamber and further including heat pipe means coupled between said heating chamber and said heating means.

2. The invention according to claim 1 wherein said probe includes a probe mast and said heating means comprises an electric heater disposed on said probe mast.

3. The invention according to claim 1 wherein said heating means includes a heat transmitting duct coupled to an engine airbleed duct.

* * * * *